United States Patent [19]

Abe

[11] Patent Number: 4,773,616
[45] Date of Patent: Sep. 27, 1988

[54] CASSETTE TAPE LOADING APPARATUS

[75] Inventor: Fumiyoshi Abe, Kanagawa, Japan

[73] Assignee: Sony Corporation, Tokyo, Japan

[21] Appl. No.: 62,634

[22] Filed: Jun. 16, 1987

[30] Foreign Application Priority Data

Jun. 30, 1986 [JP] Japan ................................ 61-153301

[51] Int. Cl.$^4$ .......................... B65H 23/04; H02P 5/50
[52] U.S. Cl. ................................ 242/203; 242/75.51; 318/7
[58] Field of Search ........................ 242/186, 20, -203, 242/75, 75.5, 75.51; 318/6, 7; 360/73, 93, 96.1, 96.3

[56] References Cited

U.S. PATENT DOCUMENTS

| | | | |
|---|---|---|---|
| 3,704,401 | 11/1972 | Miller | 318/7 |
| 3,842,326 | 10/1974 | Stocker | 318/7 |
| 3,913,866 | 10/1975 | Hankins | 318/7 X |
| 4,051,415 | 9/1977 | Martin | 318/7 |
| 4,095,146 | 6/1978 | Spaman et al. | 318/7 |
| 4,513,229 | 4/1985 | Kudeleski | 242/75.51 X |

Primary Examiner—David Werner
Attorney, Agent, or Firm—Lewis H. Eslinger

[57] ABSTRACT

A cassette tape loading apparatus is provided, by which a cassette tape wound around a pair of reels of a tape cassette is drawn from the tape cassette, wrapped around a rotary head drum of a cassette tape recorder and then recorded and/or reproduced, in which revolution speed of a reel motor rotating each of the reels is detected by a revolution speed detector and the detected revolution speed is compared with a reference revolution speed, and then on the basis of the compared results, the revolution speed of the reel motor is controlled to prevent the tape from being supplied from one reel to the other reel upon tape loading or tape unloading, whereby the position at which the tape is wrapped around the rotary head drum can be prevented from being displaced considerably and the tape can be protected from being damaged.

5 Claims, 2 Drawing Sheets

CASSETTE TAPE LOADING APPARATUS

BACKGROUND OF THE INVENTION

1. Field of the Invention

The present invention relates generally to loading apparatus and more particularly to a cassette tape loading apparatus suitable for use with a cassette tape recorder in which a tape is drawn from a tape cassette, wrapped around a rotary head drum and then recorded or reproduced by a rotary head.

2. Description of the Prior Art

A known so-called M-type loading mechanism is a cassette tape loading mechanism by which a tape is drawn from a tape cassette loaded to a cassette tape recorder and wrapped around its rotary head drum. According to this M-type loading mechanism, a pair of tape drawing pins are moved along both sides of the rotary head drum in substantially parallel relation to each other so as to draw the tape from the loaded cassette.

FIG. 1 schematically illustrates an example of such and M-type loading mechanism which is used in a cassette tape recorder or the like.

Referring to FIG. 1, there is provided a rotary head drum or rotary drum 1 around which a tape 2 is to be wrapped, a supply reel 3 for supplying the tape 2, a take-up reel 4 for rewinding the tape 2, reel motors 5 and 6 used to rotate the supply and take-up reels 3 and 4, respectively, a central processing unit (CPU) 7 used to control the reel motors 5 and 6 or the like, revolution speed detectors 8 and 9, each formed of, for example, a frequency generator (FG), to detect the revolution speeds of the reel motors 5 and 6, a loading motor 10, a loading drive mechanism 11, a loading position detector 12, movable tape guides 13 to 16 driven by the loading drive mechanism 11 and fixed tape guides 17 and 18. During the loading of the tape 2, the loading drive mechanism 11 is operated through the loading motor 10 by a control signal from the CPU 7 to thereby move the movable tape guides 13 to 16 in the directions shown by solid line arrows, whereby the tape 2 is loaded onto the head drum 1 so as to establish the tape running system shown by dashed lines. Meanwhile, during the unloading of the tape 2, the movable tape guides 13 to 16 are moved in the directions opposite to the above mentioned solid line arrow directions to unload the tape 2 from the head drum 1 and the tape 2 is rewound around the supply and take-up reels 3 and 4 respectively as shown by solid lines having a large thickness.

According to the above mentioned M-type loading mechanism, it is ideal that upon tape loading, an equal tape length of the tape 2 is drawn from both the supply and take-up reels 3 and 4 of the tape cassette and wrapped around the rotary head drum and that upon tape unloading, the tape 2 is equally rewound around both the supply and take-up reels 3 and 4 and the tape 2 is accommodated within the tape cassette. If the above ideal tape loading and tape unloading are made, then even though the tape loading and tape unloading are repeated many times, the tape 2 would always be wrapped around the rotary head drum 1 at the same tape position. If the tape 2 is wrapped around both the supply and take-up reels 3 and 4 with equal tape length, it is possible that both the reel motors 5 and 6 apply equal torgue to produce a tape tension with which the tape 2 is prevented from being slackened upon tape loading and a tape tension with which the tape 2 is rewound around predetermined reels upon tape unloading. However, in most cases, the supply and take-up reels 3 and 4 differ from each other in their tape wrapping amounts. Under this condition, if both the supply and take-up reels 3 and 4 are applied with the same torque to carry out the tape loading/unloading, the ratio between the reel inertia response torque and the torque of tape tension would be broken to thereby make the actual tape supplied amount/tape rewound amount between the supply and take-up reels 3 and 4 different. As a result, the position of the tape 2 is displaced and, at every loading/unloading, the tape 2 is wrapped around the rotary head drum 1 at different tape positions. Further, if the tape winding amount between the supply and take-up reels 3 and 4 differs considerably, the tape 2 would be moved uselessly a great deal, so that, for example, upon tape loading, the tape 2 should be supplied from both the supply and take-up reels 3 and 4 but the tape 2 would actually be rewound on one of the reels.

In a home VTR (video tape recorder) which employs a tape cassette of relatively small size, the absolute amount of the tape is so small that a tape winding diameter ratio, which is the ratio of diameters of tapes wound around the reels, is small. Besides, since tape loading/unloading speed is slow, the above mentioned defect is negligible. For this reason, any particular control operation is not intended yet in the home VTR.

Meanwhile, a professional VTR used in a broadcasting station or the like is so arranged as to use a tape with a very long length to improve the picture quality. Further, a tape cassette is required to have the tape with a long length by the demand for long-recording/playback. This makes the tape casstte large in size. In this large-sized tape cassette, the tape winding diameter ratio between the supply and take-up reels is naturally large, so that the balance of the tape supply/rewind amount between the tape supply reel and take-up reel is broken upon loading/unloading to cause the tape to be moved in one direction.

Further, an automatic tape cassette transporting machine is used in the broadcasting station to automate the transmission of broadcasting programs. This automatic tape cassette transporting machine comprises a cassette rack in which a number of tape cassettes are incorporated and a plurality of VTRs, in which a tape cassette selected from the cassette rack is transported by a cassette carrier, loaded onto a VTR and then reproduced. In this case, it is required that the reproduction be continuously carried out so as to prevent the reproduction from being interrupted.

In order to continuously reproduce a number of tape cassettes, the playback time of each of which is as short as that of commercial and spot news, by the VTRs, the number of which is limited, it is required that the tape cassette selected from the cassette rack be loaded to the VTR as quickly as possible, the tape be drawn from the tape cassette and the VTR be placed in the standby mode, while after the playback of the tape is ended, the tape is returned into the tape cassette, the tape cassette is ejected from the VTR and transported by the cassette carrier and returned to the cassette rack. For this reason, the loading/unloading of the tape of the tape cassette is preferably carried out at a speed as high as possible. However, if the high speed loading/unloading is carried out using the large-sized tape cassette in which the tape winding diameter ratio between both the reels is large and in which the tape tends to move uselessly, the tape position is displaced and the tape can not be protected from being damaged due to the abnormal tape movement.

The above mentioned defects can be overcome by applying appropriate torques to the reels in response to the tape winding amounts of both the reels. However, it is not possible to detect the tape winding amounts on the reels within the tape cassette just after the tape cassette is loaded on the VTR, so that the above mentioned method can not be realized. In order to detect the tape winding amounts on the reels, it is proposed to slightly move the tape before it is drawn from the tape cassette and to detect the tape winding amount by the known method. This previously proposed method takes a lot of time and so it is not suitable for the high speed tape loading/unloading.

OBJECTS AND SUMMARY OF THE INVENTION

Accordingly, it is an object of this invention to provide an improved cassette tape loading apparatus.

It is another object of this invention to provide a cassette tape loading apparatus which can prevent the tape from being uselessly moved, or the positional displacement of tape affected, even when high speed tape loading/unloading is carried out with a large-sized tape cassette.

According to one aspect of the present invention, there is provided a cassette tape loading apparatus for use with a cassette tape recorder into which a tape cassette having a pair of reels around which a tape-like recording medium is wound is loaded and the tape-like recording medium is drawn from the tape cassette for recording and reproducing, comprising:

(a) a pair of reel motors for rotating the pair of reels, respectively;

(b) speed detecting a means for detecting revolution speed of each of the pair of reel motors;

(c) reference speed generating means for generating a reference speed;

(d) comparing means for comparing the revolution speed of each of the pair of reel motors with the reference speed; and (e) motor control means for controlling the rotation of each of the pair of reel motors on the basis of a compared result of said comparing means upon loading or unloading of said tape-like recording medium, so that upon loading or unloading, said tape-like recording medium can be prevented from being wrapped around one of said reels and further so that a substantially equal length of said tape-like recording medium is drawn from each of said pair of reels upon loading and rewound therearound upon unloading.

According to another aspect of the present invention, there is provided a cassette tape loading apparatus for use with a cassette tape recorder into which a tape cassette having a pair of reels around which a tape-like recording medium is wound is loaded and said tape-like recording medium is drawn from said tape cassette for recording and reproducing, comprising:

(a) a pair of reel motors for rotating the pair of reels;

(b) torque setting means for generating a torque control signal, each of said pair of reel motors applying a torque necessary for loading/unloading said tape;

(c) first speed detecting means for detecting the revolution speed of one of the pair of reel motors;

(d) reference speed generating means for generating a reference speed;

(e) comparing means for comparing the revolution speed of one of the pair of reel motors with the reference speed;

(f) speed control means for generating a speed control signal for the one of the pair of reel motors on the basis of a compared result of the comparing means; and (g) adding means for adding the speed control signal to the torque control signal and for supplying the added signal to the one of the pair of reel motors, so that upon loading or unloading, said tape-like recording medium is prevented from being wrapped around one reel in the pair of reels and further so that a substantially equal length of the tape-like recording medium is drawn from each of the pair of reel upon unloading or rewound therearound with equal tape length.

These and other objects, features and advantages of the present invention will become apparent from the following detailed description of the preferred embodiments that is to be read in conjunction with the accompanying drawings, in which like reference numerals identify like elements and parts.

DESCRIPTION OF THE PREFERRED EMBODIMENTS

Figure 2:
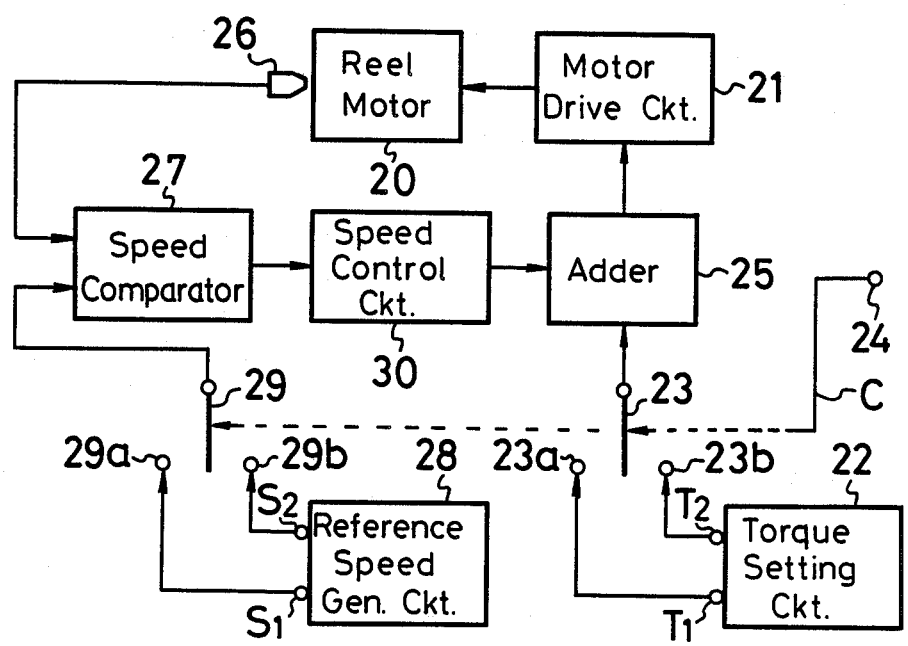
FIG. 2 is a block diagram showing an embodiment of a cassette tape loading apparatus according to the present invention.

Now, the present invention will hereinafter be described in detail with reference to FIGS. 2 and 3. FIG. 2 illustrates an embodiment of a cassette tape loading apparatus according to the present invention.

Figure 1:
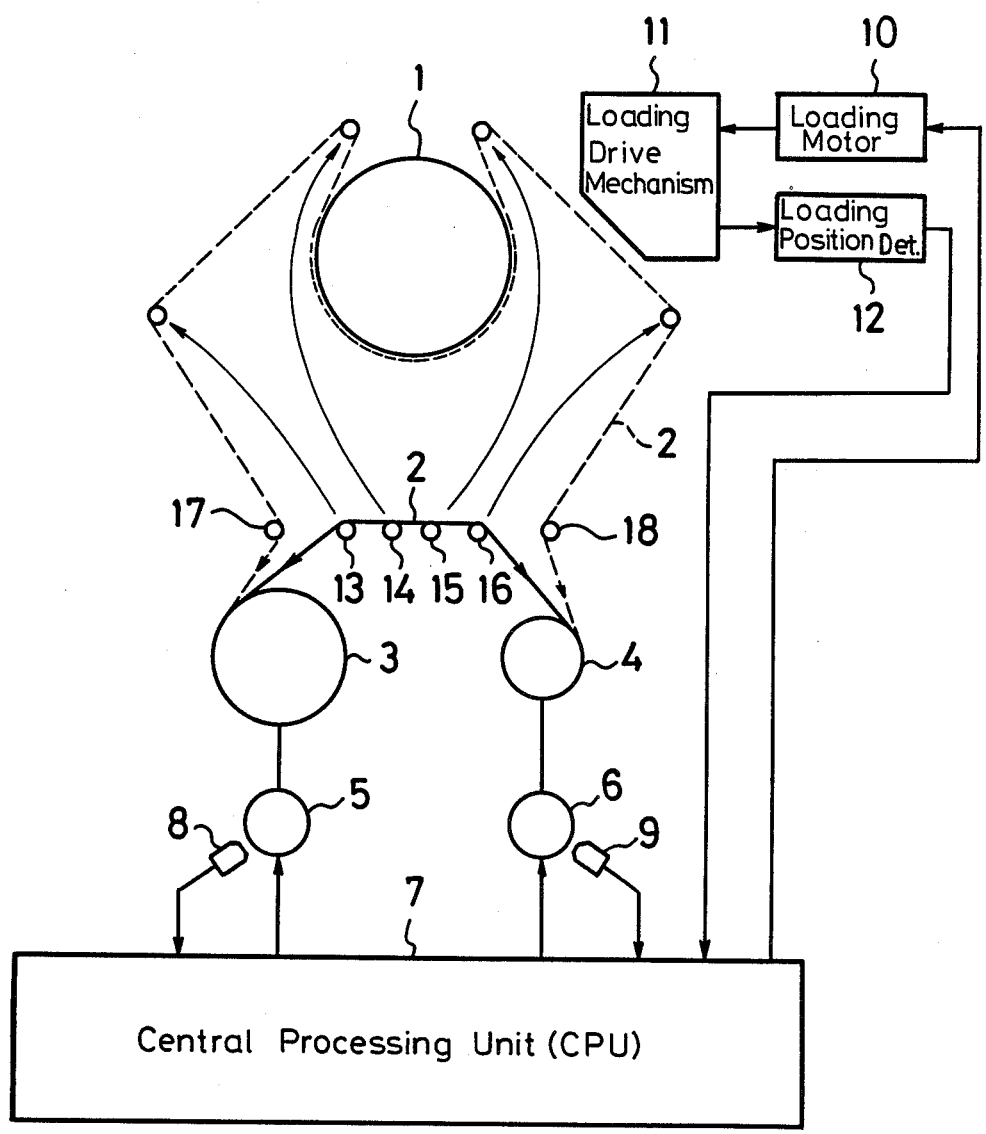
FIG. 1 is a schematic representation of an example of a known so-called M-type loading mechanism.

Referring to FIG. 2, a reel motor 20 is used to rotate a supply reel or take-up reel (not shown) and corresponds to the reel motor 5 or 6 of FIG. 1. The reel motor 20 is driven under the control of a motor drive circuit 21. A torque setting circuit 22 is adapted to generate from its output terminal T1 a torque corresponding to a predetermined back tension necessary for a tape upon loading. This torque setting circuit 22 generates from its output terminal T2 a torque corresponding to a rewind tension necessary for rewinding the tape around the reel upon unloading. Each of the torques set by the torque setting circuit 22 is a fixed value. A switch 23 is changed in position between a fixed contact 23a connected to the terminal T1 and a fixed contact 23b connected to the terminal T2 in response to a status signal C applied thereto from an input terminal 24. The status signal C indicates the loading mode or unloading mode of the tape. Upon loading, the switch 23 is connected to the fixed contact 23a and to the fixed contact 23b upon unloading. The torque signal selected by the switch 23 is supplied through an adder 25 to the motor drive circuit 21 which drives the reel motor 20 to produce a torque corresponding to loading or unloading. A rotation detector 26 may be an FG detecting circuit or the like to detect the revolution speed of the reel motor 20. The rotation detector 26 generates an output corresponding to the revolution speed of the reel motor 20 and this output is supplied to one input of a speed comparator 27. A reference speed generator circuit 28 generates from its output terminal S1 a signal corresponding to a mean value of speeds at which the tape is drawn from both the supply reel and the take-up reel with substantially equal tape lengths upon loading and also generates from its output terminal S2 a signal corresponding to a mean value of speeds at which the tape is rewound around both the supply reel and the take-up reel with substantially equal tape lengths upon unloading. A switch 29 is switched between a fixed contact 29a connected to the terminal S1 and a fixed contact 29b connected to the terminal S2 in response to the above mentioned status signal C from the input terminal 24, similarly to the switch 23. The switch 29 is connected to the fixed contact 29a upon loading and to the fixed contact 29b upon unloading. The reference speed signal selected by the switch 29 is supplied to the other input terminal of the speed comparator 27. This speed comparator 27 compares the real speed of the reel motor 20 derived from the rotation detector 26 and the selected reference speed with each other. This speed comparator 27 detects whether the reel motor 20 is rotated at speed different from the reference speed due to the unbalance of the tapes wrapped around the reels though the reel motor 20 is driven on the basis of the value set by the torque setting circuit 22, and then generates an error signal. This detected error signal is supplied to a speed control circuit 30 from the speed comparator 27. The speed control circuit 30 generates a speed control signal by which the reel motor 20 is rotated at the reference speed. The speed control signal therefrom is supplied to the adder 25.

As described above, the reel motor 20 is rotated in response to the fixed set value of the torque setting circuit 22 and the revolution speed of the reel motor 20 is detected by the rotation detector 26 and compared with the reference speed. When the compared result indicates that abnormality is occurred in the revolution speed of the reel motor 20 due to the unbalance of the amounts of tape wrapped around the reels, the speed control circuit 30 generates the speed control signal by which the reel motor 20 is controlled to rotate at the reference rotation speed. Thus, it becomes possible to prevent the tape from being moved uselessly upon tape loading/tape unloading.

In this embodiment, since the value set by the reference speed generating circuit 28 is a fixed value which is the mean value between the revolution speed (Vmax) of the reel upon loading/unloading under the condition that the tape is wrapped around the reel to a maximum extent and the revolution speed (Vmin) of the reel upon loading/unloading under the condition that the tape is wrapped around the reel to a minimum extent, the tape will be moved very slightly. But this does not become a serious problem.

In FIG. 2, if the reel motor 20 is adapted to drive the supply reel, in association with the reel motor to drive the take-up reel, there are provided the motor drive circuit, the adder, the rotation detector, the speed comparator and speed control circuit similar to the reel motor 20 for the supply reel shown in FIG. 2. In this case, the torque setting circuit 22, the switches 23, 29 and the reference speed generator circuit 28 are common to both the circuit arrangements.

Figure 3:
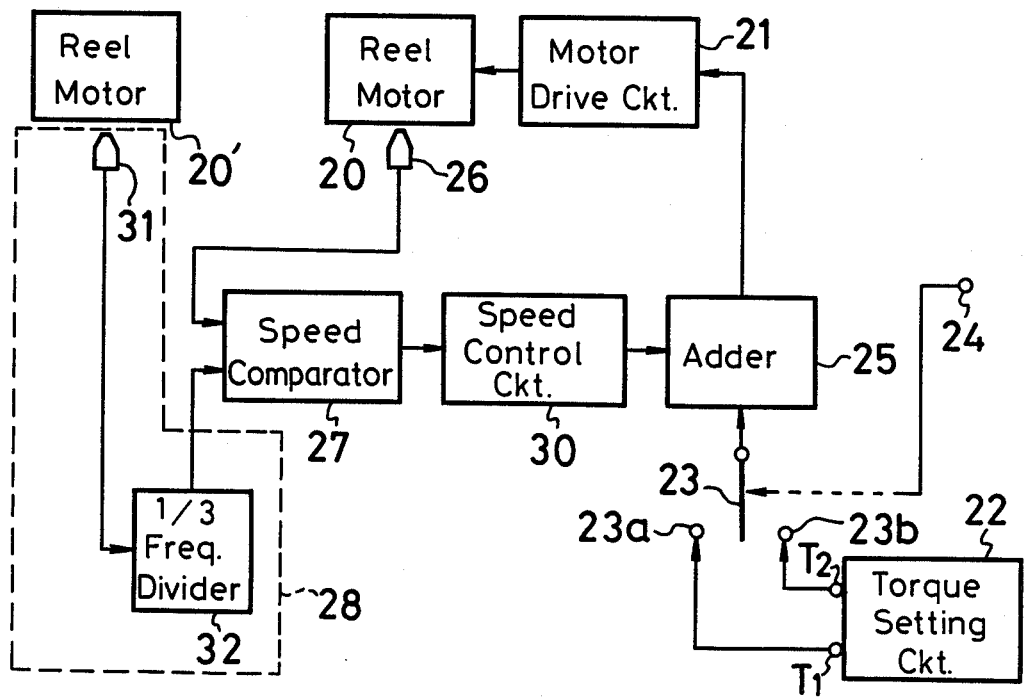
FIG. 3 is a block diagram showing another embodiment of the cassette tape loading apparatus according to the present invention.

FIG. 3 illustrates another embodiment of the present invention in which the reference speed is set by another method. In FIG. 3, like parts corresponding to those of FIG. 2 are marked with the same references and therefore need not be described in detail.

As illustrated in FIG. 3, reference numeral 20' designates another reel motor. The revolution speed of the reel motor 20' is detected by a rotation detector 31 in the reference speed generator circuit 28. In this embodiment, the reference speed generator circuit 28 further comprises a frequency divider 32. The revolution speed of the reel motor 20' is detected by the rotation detector 31 and supplied through the frequency divider 32 to the other input of the speed comparator 27. The frequency dividing ratio of the frequency divider 32 may be a maximum tape rewound diameter ratio, or a tape winding diameter ratio in which most of the tape is wound around one tape reel and substantially no tape is wrapped around the other tape reel. In this embodiment, the frequency dividing ratio is selected to be $\frac{1}{3}$ because the above tape winding diameter ratio is nearly 3. In other words, the revolution speed ratio between the reel motors 20 and 20' is $\frac{1}{3}$ when the tape is drawn from and rewound around both the reels with equal tape lengths under the condition that the tape winding diameter ratio is substantially equal to the maximum winding diameter ratio, and the revolution speed will not be lowered from the above mentioned value. Since the value [1/maximum tape winding diameter ratio] of the revolution speed of the second motor 20' is taken as the reference speed and compared with the revolution speed of the first reel motor 20 to thereby generate the speed control signal, it becomes possible to prevent the tape from being moved uselessly upon tape loading-/tape unloading.

In the embodiment of FIG. 3, it is assumed that the reel motor 20 is used to drive the supply reel and the reel motor 20' is adapted to drive the take-up reel, but when instead the reel motor 20 is adapted to drive the take-up reel and the reel motor 20' is used to drive the supply reel, the circuit elements 21, 25, 26, 27, 30, 31 and 32 shown in FIG. 3 are similarly provided. In this case, the torque setting circuit 22 and the switch 23 are common to both the circuit arrangements.

The reference speed is not limited to those values of FIGS. 2 and 3 but may be selected from fixed values of tape winding diameter ratio at which, upon loading/unloading, the reel motor can be prevented from being rotated in the reverse direction because the tape winding diameters of both the reels are considerably different. The above mentioned fixed values can prevent the tape from being uselessly moved and various values can be set in accordance with various requirements in practice.

The above description is given on the preferred embodiments of the invention but it will be apparent that many modifications and variations could be effected by one skilled in the art without departing from the spirit or scope of the novel concepts of the invention, so that the scope of the invention should be determined by the appended claims only.

I claim as my invention:

1. A cassette tape loading apparatus for use with a cassette tape recorder into which is loaded a tape cassette having first and second reels around which a tape-like recording medium is wound, said tape-like recording medium being drawn from said tape cassette for recording and reproducing, comprising:

first and second reel motors for rotating said first and second reels;

torque setting means for generating a torque control signal, each of said first and second reel motors being responsive to said torque control signal to apply a torque necessary for loading and unloading said tape-like recording medium;

first speed detecting means for detecting a revolution speed of said first reel motor;

reference speed generating means for generating a reference speed;

comparing means for comparing the revolution speed of said first reel motor with said reference speed and producing a compared result;

speed control means for generating a speed control signal for said first reel motor on the basis of said compared result of said comparing means; and adding means for adding said speed control signal to said torque control signal to produce an added signal supplied to said first reel motor so that upon loading and unloading, said tape-like recording medium is prevented from being wrapped around one of said reels and further so that a substantially equal tape length of said tape-like recording medium is drawn from each of said first and second reels upon loading and rewound therearound upon unloading.

2. The apparatus according to claim 1, in which said reference speed generating means includes second speed detecting means for detecting a revolution speed of said second reel motor and generates the reference speed in further response to said detected revolution speed of said second reel motor.

3. The apparatus according to claim 2, in which said reference speed generating means includes frequency dividing means for dividing the detected revolution speed of said second reel motor and generates a frequency-divided revolution speed as the reference speed.

4. The apparatus according to claim 3, in which a frequency dividing ratio of said frequency dividing means is equal to a maximum tape winding diameter ratio between said first and second reels.

5. The apparatus according to claim 1, in which said reference speed generating means generates as said reference speed a mean value between a reel revolution speed upon loading and unloading under the condition that said tape-like recording medium is wrapped around one of said reels to a maximum extent and a reel revolution speed upon loading and unloading under the condition that said tape-like recording medium is wrapped around one of said reels to a minimum extent.

* * * * *